US012005606B2

(12) United States Patent
Rainey

(10) Patent No.: US 12,005,606 B2
(45) Date of Patent: Jun. 11, 2024

(54) ADJUSTABLE MOLD FOR MAKING PRECAST CONCRETE TRAFFIC BARRIER PANELS WITH DIFFERENT GEOMETRIES FOR USE IN MODULAR EARTH RETAINING WALLS

(71) Applicant: Earth Wall Products, LLC, Smyrna, GA (US)

(72) Inventor: Thomas Leonard Rainey, Marietta, GA (US)

(73) Assignee: EARTHWALL PRODUCTS, LLC, Smyrna, GA (US)

( * ) Notice: Subject to any disclaimer, the term of this patent is extended or adjusted under 35 U.S.C. 154(b) by 115 days.

(21) Appl. No.: 17/577,889

(22) Filed: Jan. 18, 2022

(65) Prior Publication Data

US 2023/0226717 A1 Jul. 20, 2023

(51) Int. Cl.

*B28B 7/02* (2006.01)
*B28B 1/14* (2006.01)
*E01F 15/08* (2006.01)

(52) U.S. Cl.

CPC .................. *B28B 7/02* (2013.01); *B28B 1/14* (2013.01); *E01F 15/083* (2013.01)

(58) Field of Classification Search

CPC .................................... B28B 7/02; B28B 1/14
See application file for complete search history.

(56) References Cited

U.S. PATENT DOCUMENTS 4,921,204 A * 5/1990 Melfi ........................ B28B 7/02 404/98
9,663,907 B2 5/2017 Rainey

* cited by examiner

*Primary Examiner* — Nicholas R Krasnow
(74) *Attorney, Agent, or Firm* — Thomas | Horstemeyer, LLP

(57) ABSTRACT

Various embodiments of an adjustable mold and method for making precast concrete traffic barrier panels with different geometries are disclosed. The panels are used for creating a continuous traffic barrier by placing the panels in a contiguous side-by-side arrangement adjacent a roadway atop a modular earth retaining wall. Each traffic barrier panel has a body with at least front, back, top, bottom, left, and right sides. The mold body has a plurality of walls that define an interior chamber, a door opening to the interior chamber, and a concrete inlet to the interior chamber. The door is designed to be installed on and to be uninstalled from the mold body to respectively close and open the door opening. The door has left side and right side forming panels that are designed to define respectively a left side two-dimensional geometry and a right side two-dimensional geometry of the left and right sides respectively of a traffic barrier panel to be made. The left side and right side two-dimensional geometries are changeable by interchanging the door with differently oriented forming panels or by adjusting two-dimensional orientations of each of the left side and right side forming panels on the existing door. The interior chamber of the mold body in combination with an interior side of the door define an outer surface geometry of the front, back, top, bottom, left, and right sides of the traffic barrier panel to be made.

6 Claims, 11 Drawing Sheets

ADJUSTABLE MOLD FOR MAKING PRECAST CONCRETE TRAFFIC BARRIER PANELS WITH DIFFERENT GEOMETRIES FOR USE IN MODULAR EARTH RETAINING WALLS

FIELD OF THE INVENTION

The present invention generally relates to modular earth retaining walls, and more particularly, to an adjustable mold for producing precast concrete traffic barrier panels having varying geometries, or varying shapes and/or sizes, for use in a modular earth retaining wall, for example but not limited to, a modular mechanically stabilized (MSE) earth retaining wall.

BACKGROUND OF THE INVENTION

Modular earth retaining walls with concrete panels, or blocks, are commonly used for architectural and site development applications. Such walls are subjected to very high pressures exerted by lateral movements of the soil, temperature and shrinkage effects, and seismic loads. In many commercial applications, for example, along or supporting highways, etc., the concrete panels are huge and heavy. Each concrete panel can weigh between two and five thousand pounds and have a front elevational size of about eight to ten feet in width by about five feet four inches in height.

Most often, the earth retaining walls of this type are reinforced. A conventional mechanically stabilized earth (MSE) retaining wall with steel or polymer belt reinforcement is typically reinforced with steel strips or welded wire meshes that extends backward, or perpendicular, from the rear of a concrete panel to reinforce the backfill soil.

Typically, molds are used to manufacture the modular precast concrete panels for the retaining walls.

When roadways are located above or rest on top of the retaining wall, a traffic barrier is required in order to contain any impact of motor vehicles and prevent them from running over and falling off of the retaining wall. Examples of a conventional traffic barrier include a guard rail or poured-in-place concrete traffic barrier.

Recently, the inventor herein invented a traffic barrier system for a retaining wall in the form of a number of traffic barrier panels, which are essentially independent structures that sit side by side and stack on top of and become an integral part of the retaining wall to provide barrier protection for the roadway traffic. This traffic barrier panel is illustrated and described in U.S. Pat. No. 9,663,907, which is incorporated herein by reference in its entirety. Although a successful design, the traffic barrier panels often need to have different geometries, or shapes and/or sizes in order to accommodate the changing grade at the top of the retaining wall. In most, if not all case, a precast mold is created and used to cast only a single geometry of traffic barrier panel. Furthermore, the manufacture of various molds to accommodate all of the different-geometry traffic barrier panels that are needed for completing an entire retaining wall is cost prohibitive.

Both precast and slip form can be performed to create a traffic barrier made of these panels atop of a retaining wall. These traffic barrier panels have linear squared sides, which requires the contractor to field modify by cutting the concrete or filling in with cast in place concrete or "filler pour" to close gaps and allow transitions or turns along horizontal and vertical curvature of the roadway to have a parallel traffic barrier.

SUMMARY OF THE INVENTION

The present disclosure provides various embodiments of an adjustable mold for producing precast concrete traffic barrier panels that have varying geometries, or varying shapes and or sizes, for use in a modular earth retaining wall, for example but not limited to, a modular mechanically stabilized (MSE) earth retaining wall.

The adjustable mold of the present disclosure provides a more economical way to cast traffic barrier panels with different geometries using the same precast concrete mold. The adjustable mold is designed to make the traffic barrier panels in a variety of geometries so that (a) the two-dimensional surfaces at each of the left and right sides can be precisely designed so that adjacent panels abut each other in a more contiguous manner and (b) adjacent panels exhibit an substantially aligned coplanar top surface, when installed atop a retaining wall at grade, resulting in an aesthetically pleasing appearance. The adjustable mold makes use of adjustable and/or interchangeable parts to allow different geometries of traffic barrier panels to be cast.

First, one embodiment, among others, is an adjustable mold for making precast concrete traffic barrier panels with different geometries for creating a continuous traffic barrier by placing the traffic barrier panels in a contiguous side-by-side arrangement adjacent a roadway atop a modular earth retaining wall. Each traffic barrier panel has a body with at least front, back, top, bottom, left, and right sides. The adjustable mold has a mold body having a plurality of walls that define an interior chamber, a door opening to the interior chamber, and a concrete inlet to the interior chamber. A door is designed to be installed on and to be uninstalled from the mold body to respectively close and open the door opening. The door has adjustable forming panels that are designed to define a left side two-dimensional geometry and a right side two-dimensional geometry of the left and right sides respectively of a traffic barrier panel to be made. The two-dimensional geometry is changeable by adjusting the adjustable forming panels among a plurality of possible fixed settings. Each setting defines a particular traffic barrier panel with a particular left side two-dimensional geometry and a particular right side two-dimensional geometry at the left and right sides respectively that are different than other settings. The interior chamber of the mold body in combination with an interior side of the door define an outer surface geometry of the front, back, top, bottom, left, and right sides of the traffic barrier panel to be made.

Second, another embodiment, among others, is a method for making a precast concrete traffic barrier panel. In this regard, the method can be broadly summarized by the following steps: providing an adjustable mold as defined in the previous paragraph; uninstalling the door from the mold body if not already uninstalled; changing the first forming panel and the second forming panel to reflect respectively a desired left side two-dimensional geometry and a desired right side two-dimensional geometry for respectively the left side and right side of the traffic barrier panel to be made; installing the door on the mold body; introducing liquified concrete into the concrete inlet of the mold body; permitting the concrete to solidify in order to make the traffic barrier panel; uninstalling the selected one of the interchangeable doors; and removing the solidified traffic barrier panel from the mold body.

Third, another embodiment, among others, is an adjustable mold system for making precast concrete traffic barrier panels with different geometries for creating a continuous traffic barrier by placing the traffic barrier panels in a contiguous side-by-side arrangement adjacent a roadway atop a modular earth retaining wall. Each traffic barrier panel has a body with at least front, back, top, bottom, left, and right sides. The adjustable mold system has a mold body and a plurality, or set, of available interchangeable doors. More specifically, the mold body has a plurality of walls that define an interior chamber, a door opening to the interior chamber, and a concrete inlet to the interior chamber. Each of the available interchangeable doors is designed to be installed on and uninstalled from the mold body to respectively close and open the door opening. Each door has forming panels, and the forming panels are designed to define a two-dimensional geometry at each of the left and right sides. Each door is designed to define a traffic barrier panel that is different than other doors. The interior chamber of the mold body in combination with a particular interchangeable door from the plurality installed on the mold body defines an outer surface of the front, back, top, bottom, and left and right sides of the particular traffic barrier panel to be made.

Fourth, another embodiment, among others, is a method for making a precast concrete traffic barrier panel. In this regards, the method can be broadly summarized by the following steps: providing an adjustable mold system as defined in the previous paragraph; selecting and installing one of the plurality of interchangeable doors on the mold body to manufacture one of the traffic barrier panels with a desired two-dimensional geometry on the left and right sides; introducing liquified concrete into the concrete inlet of the mold body; permitting the concrete to solidify in order to make the traffic barrier panel; uninstalling the selected one of the interchangeable doors; and removing the solidified traffic barrier panel from the mold body.

Fifth, another embodiment, among others, is an adjustable mold for making precast concrete traffic barrier panels with different geometries for creating a continuous traffic barrier by placing the traffic barrier panels in a contiguous side-by-side arrangement adjacent a roadway atop a modular earth retaining wall. Each traffic barrier panel has a body with at least front, back, top, bottom, left, and right sides. The adjustable mold has a mold body and a door with adjustable forming panels. More specifically, the mold body has a plurality of walls that define an interior chamber, a door opening to the interior chamber, and a concrete inlet to the interior chamber. The door is designed to be installed on and to be uninstalled from the mold body to respectively close and open the door opening. The door has adjustable left side and right side forming panels that are designed to define respectively a left side two-dimensional geometry and a right side two-dimensional geometry of the left and right sides respectively of a traffic barrier panel to be made. The left side and right side two-dimensional geometries are changeable by adjusting two-dimensional orientations of each of the adjustable left side and right side forming panels. The interior chamber of the mold body in combination with an interior side of the door define an outer surface geometry of the front, back, top, bottom, left, and right sides of the traffic barrier panel to be made.

Sixth, another embodiment, among others, is a method for making a precast concrete traffic barrier panel. In this regard, the method can be broadly summarized by the following steps: providing an adjustable mold as defined in the previous paragraph; uninstalling the door from the mold body; changing the first forming panel and the second forming panel to reflect respectively a desired left side two-dimensional geometry and a desired right side two-dimensional geometry for respectively the left side and right side of the traffic barrier panel to be made; installing the door on the mold body; introducing liquified concrete into the concrete inlet of the mold body; permitting the concrete to solidify in order to make the traffic barrier panel; uninstalling the selected one of the interchangeable doors; and removing the solidified traffic barrier panel from the mold body.

Other embodiments of molds and methods, apparatus, systems, methods, features, and advantages of the present disclosure will be or become apparent to one with skill in the art upon examination of the following drawings and detailed description. It is intended that all such additional embodiments, apparatus, systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF EMBODIMENTS

Figure 1:
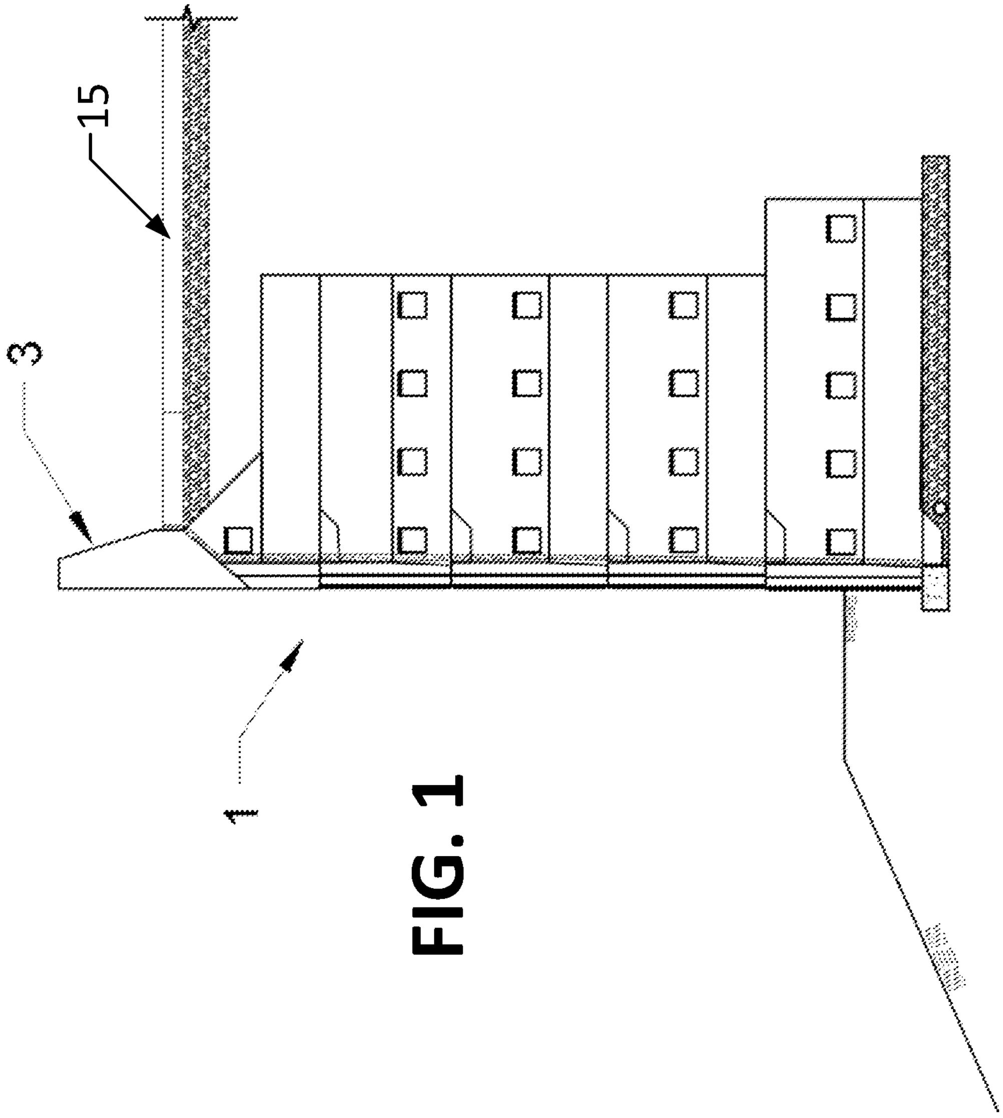
FIG. 1 is a side cross sectional view of a retaining wall that employs at its top a plurality of different-geometry precast concrete traffic barrier panels that are situated side by side and that are manufactured with the adjustable mold of the present disclosure.
Figure 3:
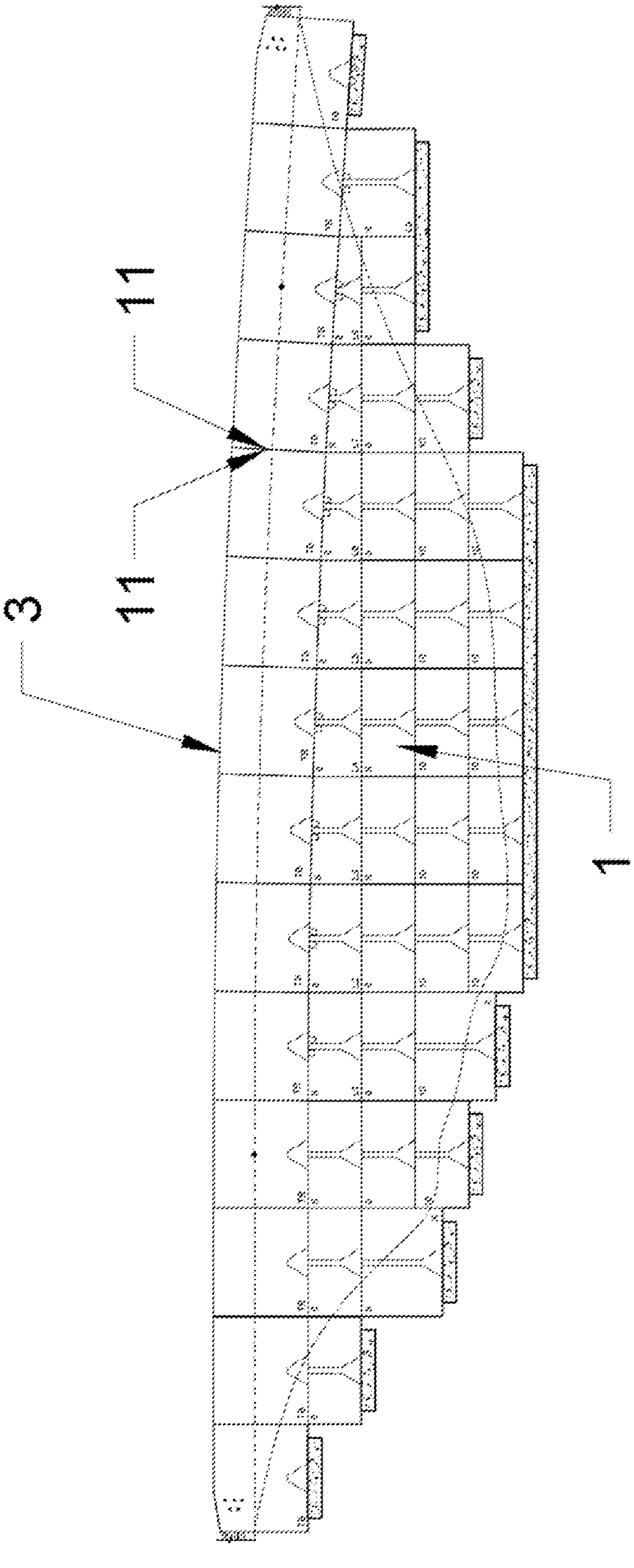
FIG. 3 is a front elevational view of the retaining wall of FIG. 1.

FIGS. 1 and 3 illustrate views of a modular earth retaining wall 1 that employs at its top a plurality of different-geometry precast concrete traffic barrier panels 3, or blocks, that are situated in a side-by-side manner, preferably contiguously, and that are manufactured with the adjustable mold 5 provided by the present disclosure. The modular earth retaining wall 1 has various layer, or tiers, of modular panels, or blocks, which are secured in place with soil backfill that underlies a roadway 15. In the preferred embodiment, the modular earth retailing wall 1 is a modular mechanically stabilized earth (MSE) retailing wall 1.

Figure 2A:
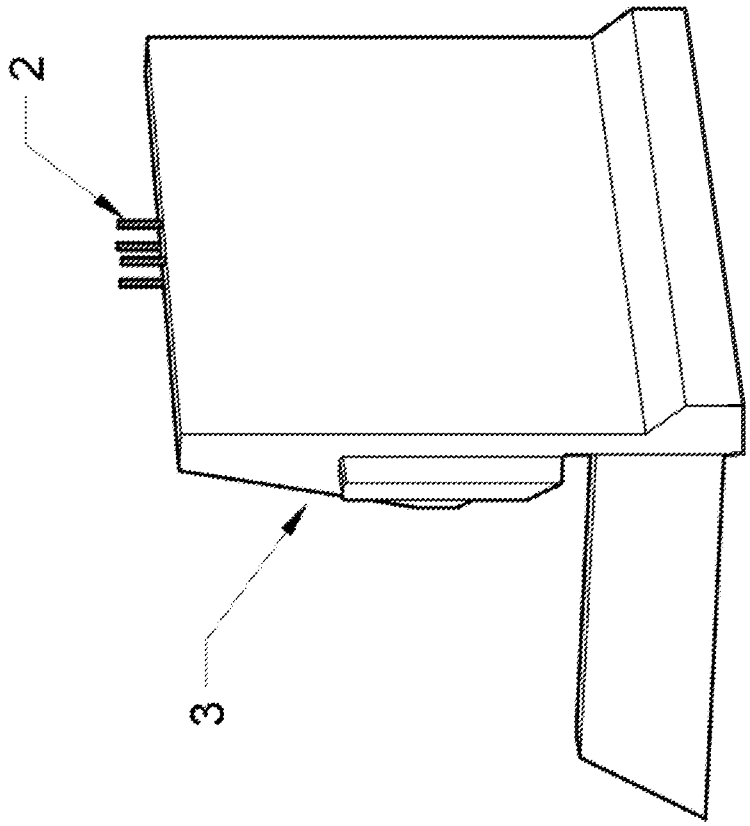
FIG. 2A is a perspective view of a precast concrete traffic barrier panel that is incorporated into the retaining wall of FIG. 1.
Figure 2C:
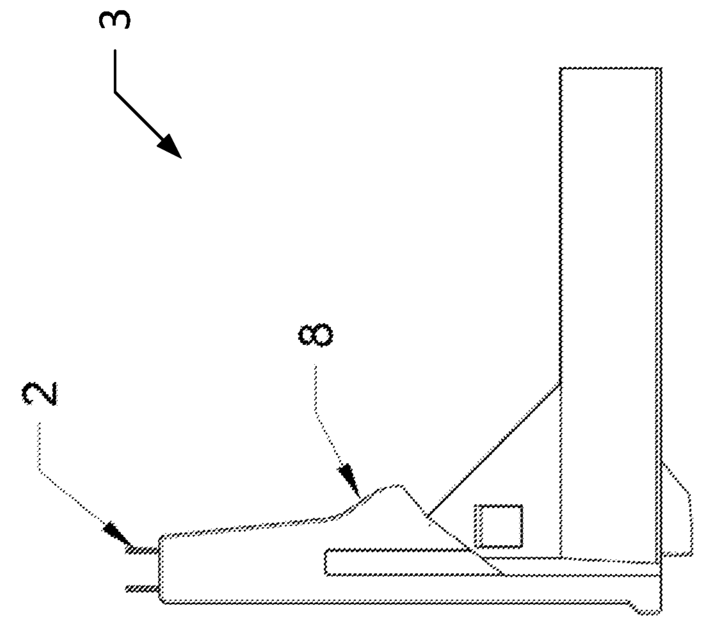
FIG. 2C is a side view of the traffic barrier panel of FIG. 2A.
Figure 2B:
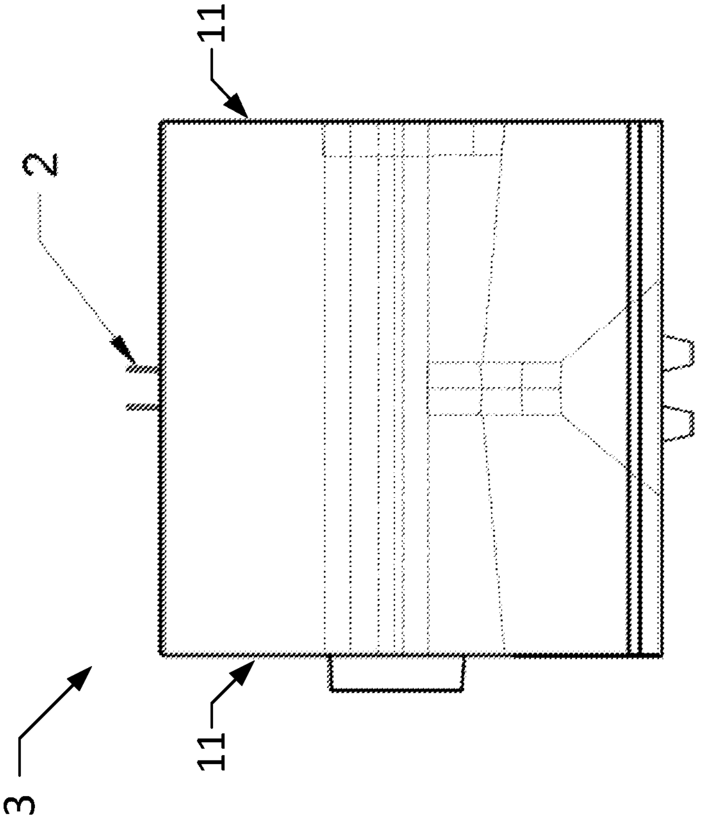
FIG. 2B is a front elevational view of the traffic barrier panel of FIG. 2A.

FIG. 2A is a perspective view of a precast concrete traffic barrier panel 3 that is incorporated into the retaining wall of FIG. 1. FIG. 2B is a front elevational view of the traffic barrier panel 3 of FIG. 2A. FIG. 2C is a side view of the traffic barrier panel 3 of FIG. 2A. The foregoing traffic barrier panel 3 is also illustrated and described in detail in U.S. Pat. No. 9,663,907, which is incorporated herein by reference in its entirety.

Figure 4:
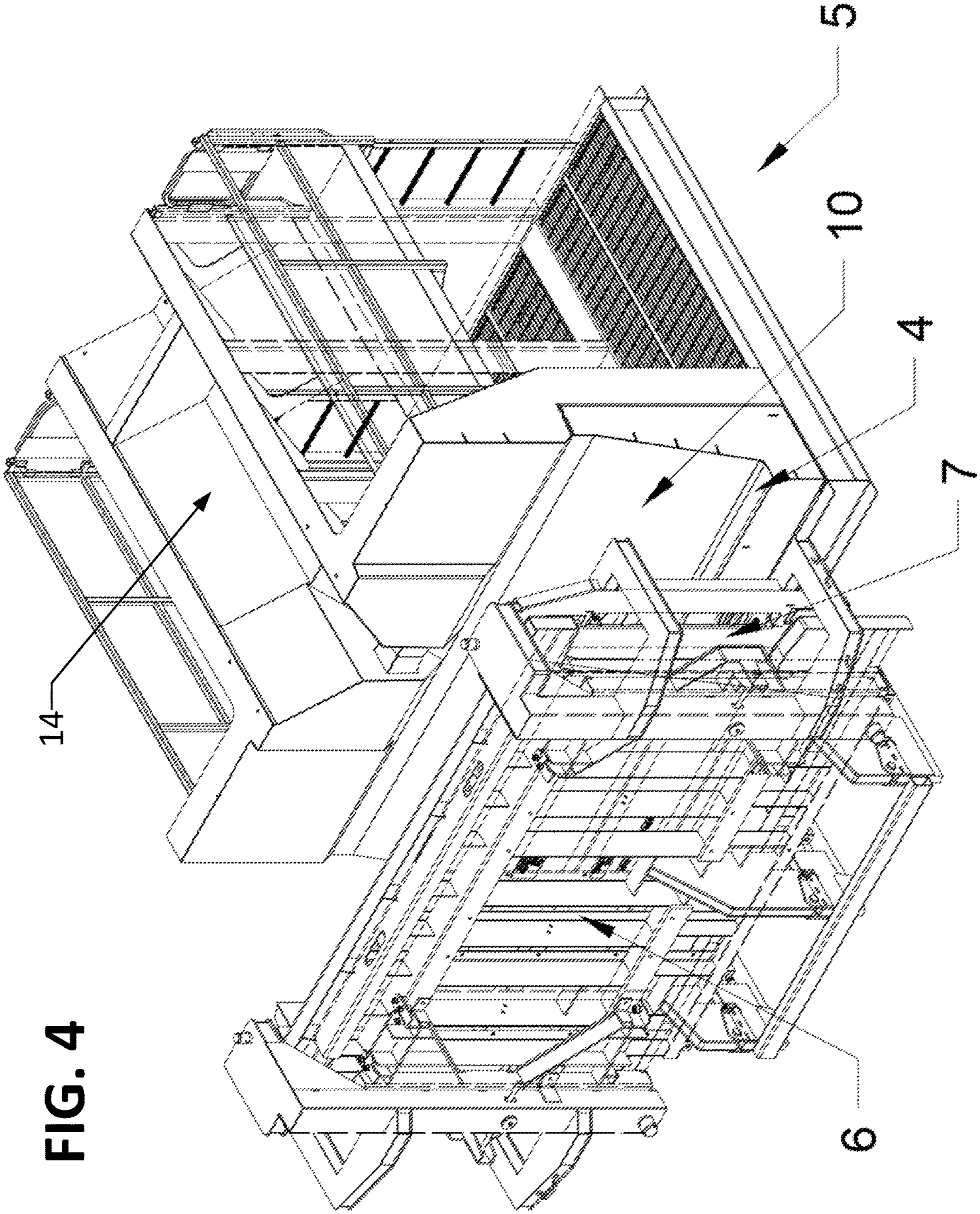
FIG. 4 is a perspective view of an adjustable mold for making precast concrete traffic barriers, in accordance with the present disclosure, in an inoperative configuration where an interchangeable door is disengaged from a mold body.
Figure 5:
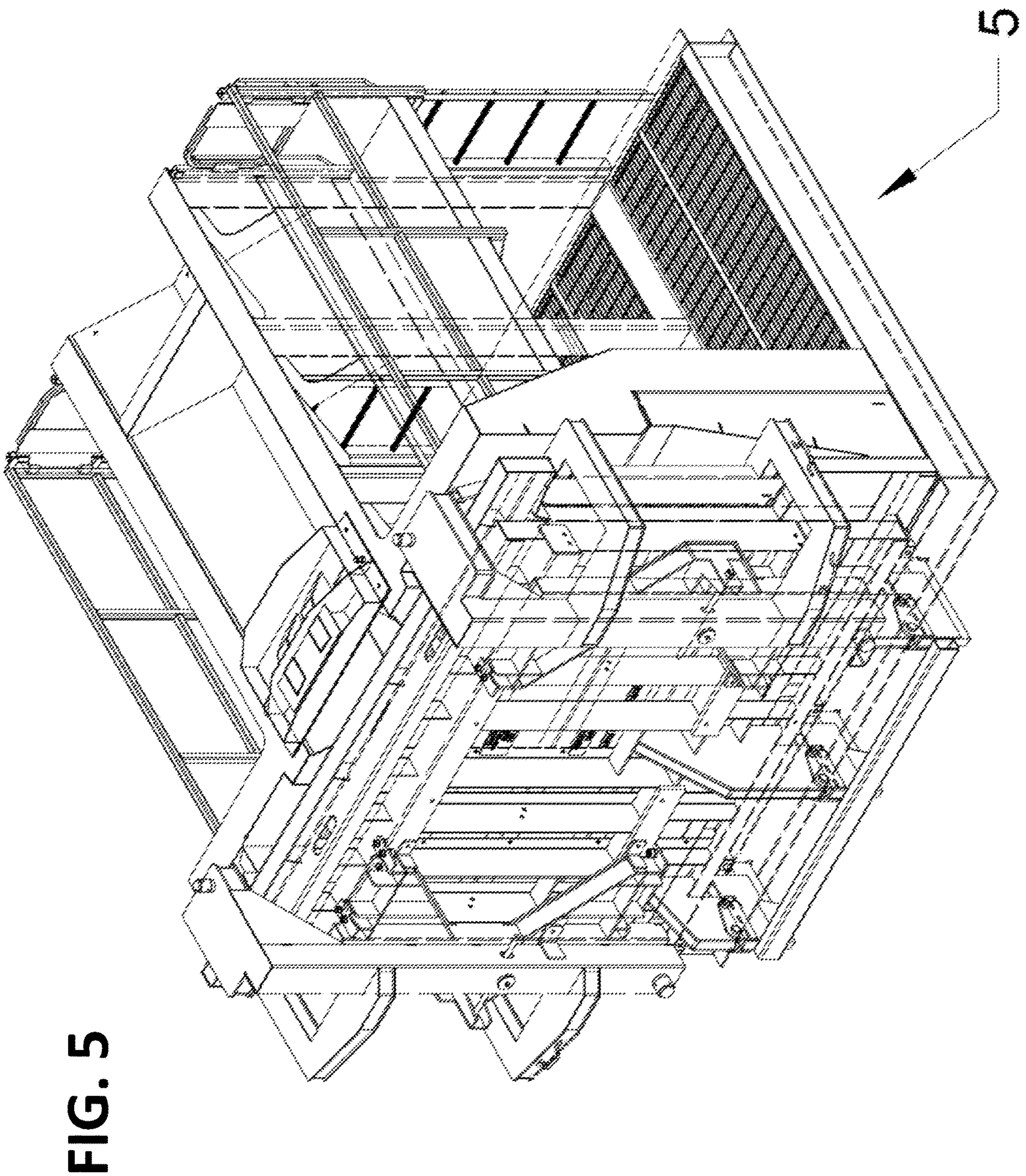
FIG. 5 is a perspective view of the adjustable mold of FIG. 4 in a fully operative configuration with the interchangeable door engaged to the mold body.
Figure 6:
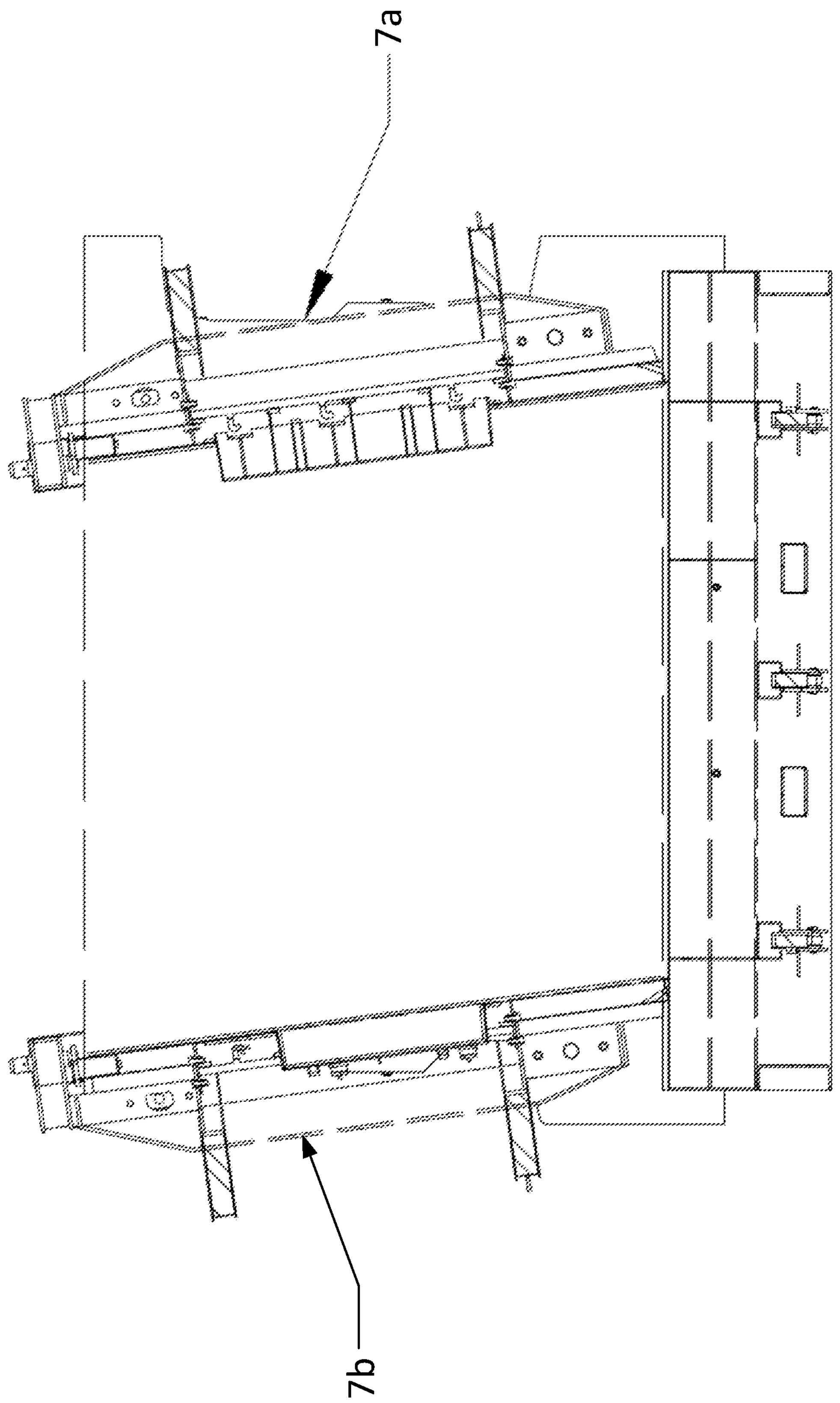
FIG. 6 is a front elevation view of the left and right side forming panels associated with an interchangeable door that are designed to change left and right side elevation angles of a traffic barrier panel (i.e., angle of the side surface as it extends between the bottom side and the top side of the panel).

FIGS. 4 and 5 show a preferred embodiment of the adjustable mold 5 of the present disclosure. The adjustable mold 5 enables producing traffic barrier panel sides to vary end or side angles and tilts to allow consistent joints, which provides a more aesthetically pleasing finished product (i.e., a continuous traffic barrier). The accurately angled sides of the panels 3 eliminate the need for a contractor to field modify by cutting the concrete or filling in with cast in place concrete or "filler pour" to close gaps and allow transitions or turns along horizontal and vertical curvature of the roadway 15 to have a parallel traffic barrier.

The adjustable mold 5 is also designed to produce panels 3 with varying front heights so that adjacent panels 3 exhibit a substantially aligned coplanar top surface when installed atop a retaining wall at grade, resulting in an aesthetically pleasing appearance.

In terms of construction, the adjustable mold 5 has a removable and/or interchangeable door 6 that is designed to be installed on and to be uninstalled from a larger mold body 10. The mold body 10 has a plurality of walls that define an interior chamber, a door opening to the interior chamber that is closed and opened by use of the door 6, and a concrete inlet at the top leading to the interior chamber for receiving liquified concrete. In general, the interior chamber of the mold body 10 in combination with an interior side of the door 6 define an outer surface geometry of the front, back, top, bottom, left, and right sides of the traffic barrier panel 3 to be made.

The door 6 has a plurality of forming panels. In the preferred embodiment, the door 6 is designed with adjustable left side and right side forming panels 7*a*, 7*b*, shown in FIGS. 6, 8A, 8B, 9, and 10, that are designed to define respectively a left side two-dimensional geometry and a right side two-dimensional geometry of respectively the left and right sides 11 of a traffic barrier panel 3 to be made. The two-dimensional geometry is changeable by adjusting the adjustable forming panels, which are mounted to the door 6 using any suitable mounting mechanism(s), for example, bolts, brackets and bolts, welding, etc. The adjustable forming panels 7 can be adjusted to any position among a plurality of possible fixed settings. Each setting defines a particular traffic barrier panel 3 with a particular left side two-dimensional geometry and a particular right side two-dimensional geometry at the left and right sides respectively that are different than other settings.

Thus, the forming panels 7*a*, 7*b* define the two-dimensional orientation of respectively the left and right sides 11 of the panels 3, i.e., to vary the angles 12 and tilt 13 of the sides of a precast traffic barrier panels 3. The tilt is the vertical angle with the rotation the horizontal angle of the actual end or side of the traffic barrier panel that abuts the next adjacent traffic barrier panel. The adjacent joints custom cast paralleling each other provides a uniform joint between adjacent modular traffic barrier panels 3.

In alternative embodiments, a plurality of interchangeable forming panels 7 can be provided, each having a different fixed setting on the door 6 to enable different two-dimensional geometries to be defined at the left and right sides of the panel 3. In these embodiments, a set of forming panels 7 are selected from an available set and then the forming panels 7 are installed on the door 6, which in turn is installed on the mold body 10.

In other alternative embodiments, a plurality of interchangeable doors 6 can be provided, each having forming panels 7 with different fixed settings. In these embodiments, a door 6 is selected from an available set and then installed on the mold body 10.

In the preferred embodiment, the mold body 10 has a removable and interchangeable floor forming panel 4 situated at or near the bottom of the interior chamber. The floor forming panel 4 is designed to be installed on and to be uninstalled from the mold body 10. The floor forming panel 4 is designed to define a geometry of the top side of the panel 3 to be made (because the panel 3 is poured and cast upside down).

Figure 7:
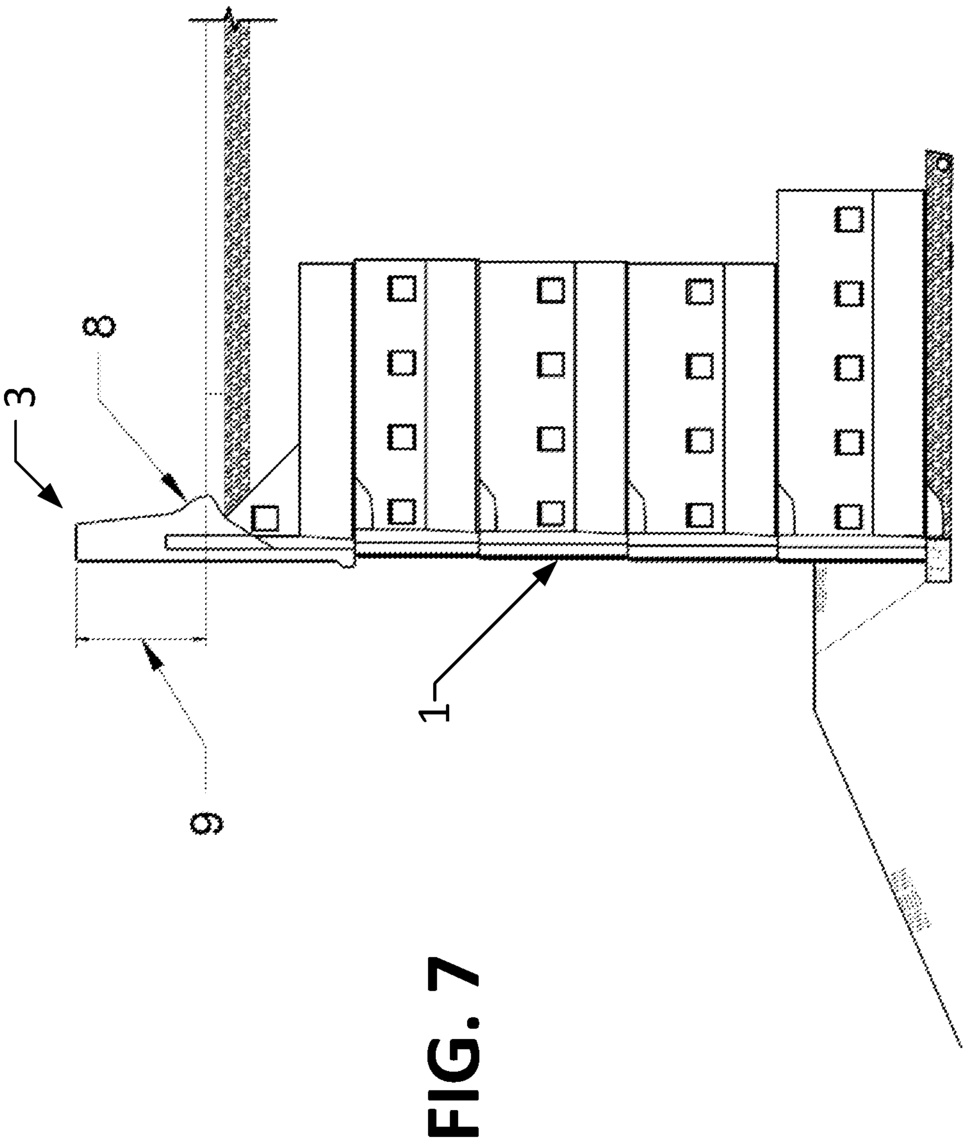
FIG. 7 is a side cross sectional view of a retaining wall that employs a precast concrete traffic barrier that is manufactured with traffic barrier panels having different geometries and produced with the adjustable mold of the present disclosure.
Figure 8B:
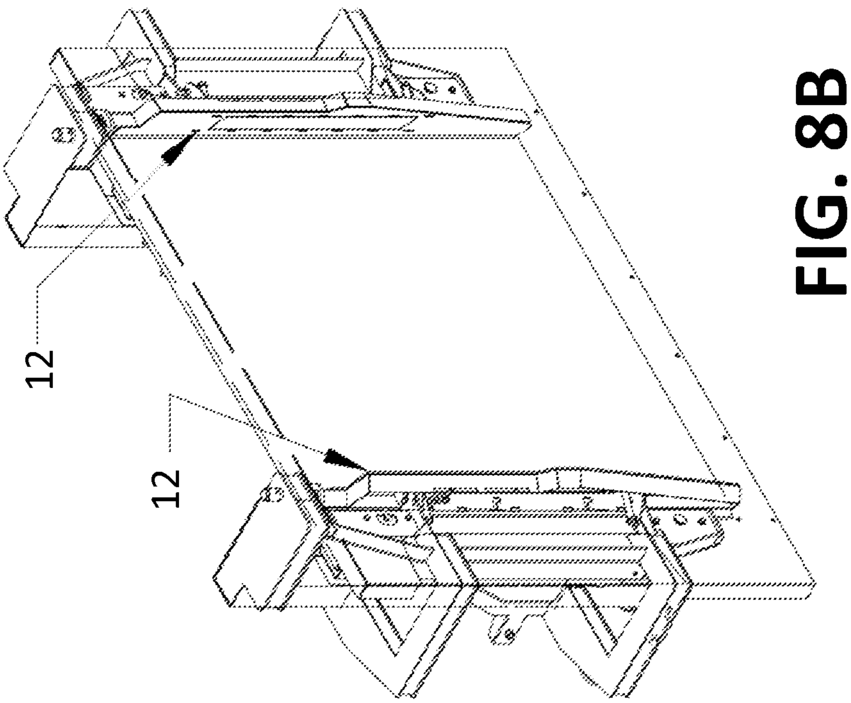
FIG. 8B is a second perspective view of the particular interchangeable door of FIG. 8A.
Figure 8A:
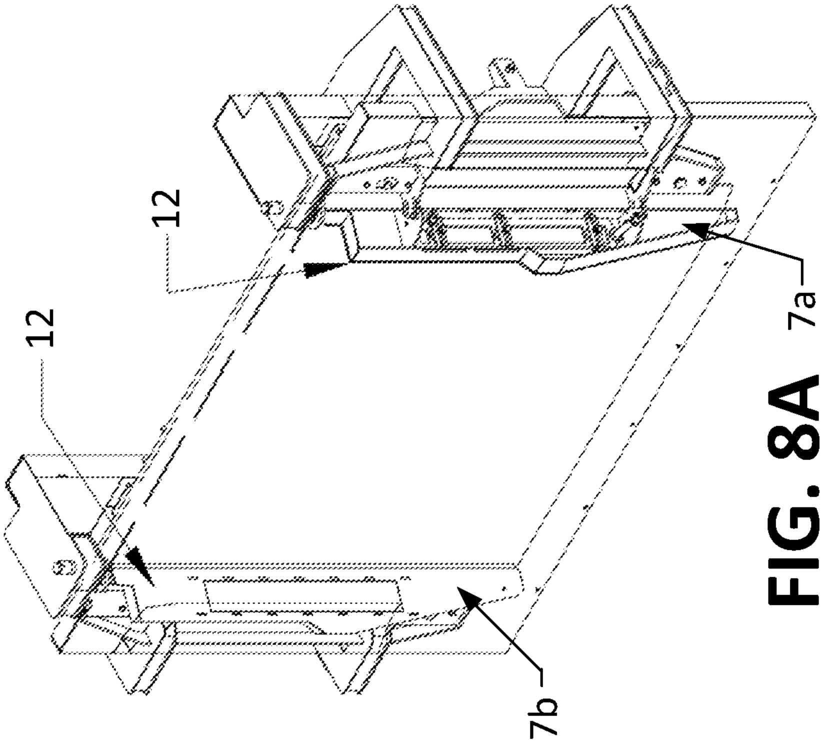
FIG. 8A is a first perspective view of a particular one of interchangeable doors that can be installed on and uninstalled from a mold body of the adjustable mold, showing forming panels at left and right sides for defining a particular one of the orientation angles of left and right sides, respectively (i.e., angle of the side surface as it extends between the front side and back side of the panel).
Figure 9:
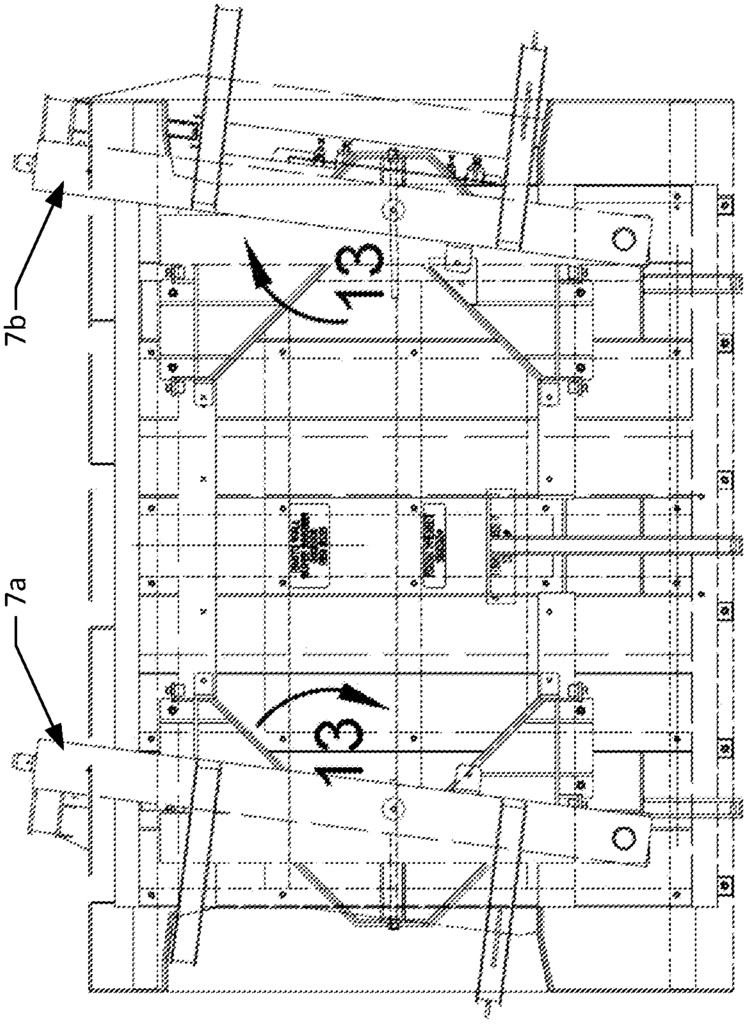
FIG. 9 is a rear elevation view of an interchangeable door with left and right side forming panels installed on an interchangeable door that are designed to change left and right side elevation angles of a traffic barrier panel (i.e., angle of side surface as it extends between the bottom side and top side of the panel).
Figure 10:
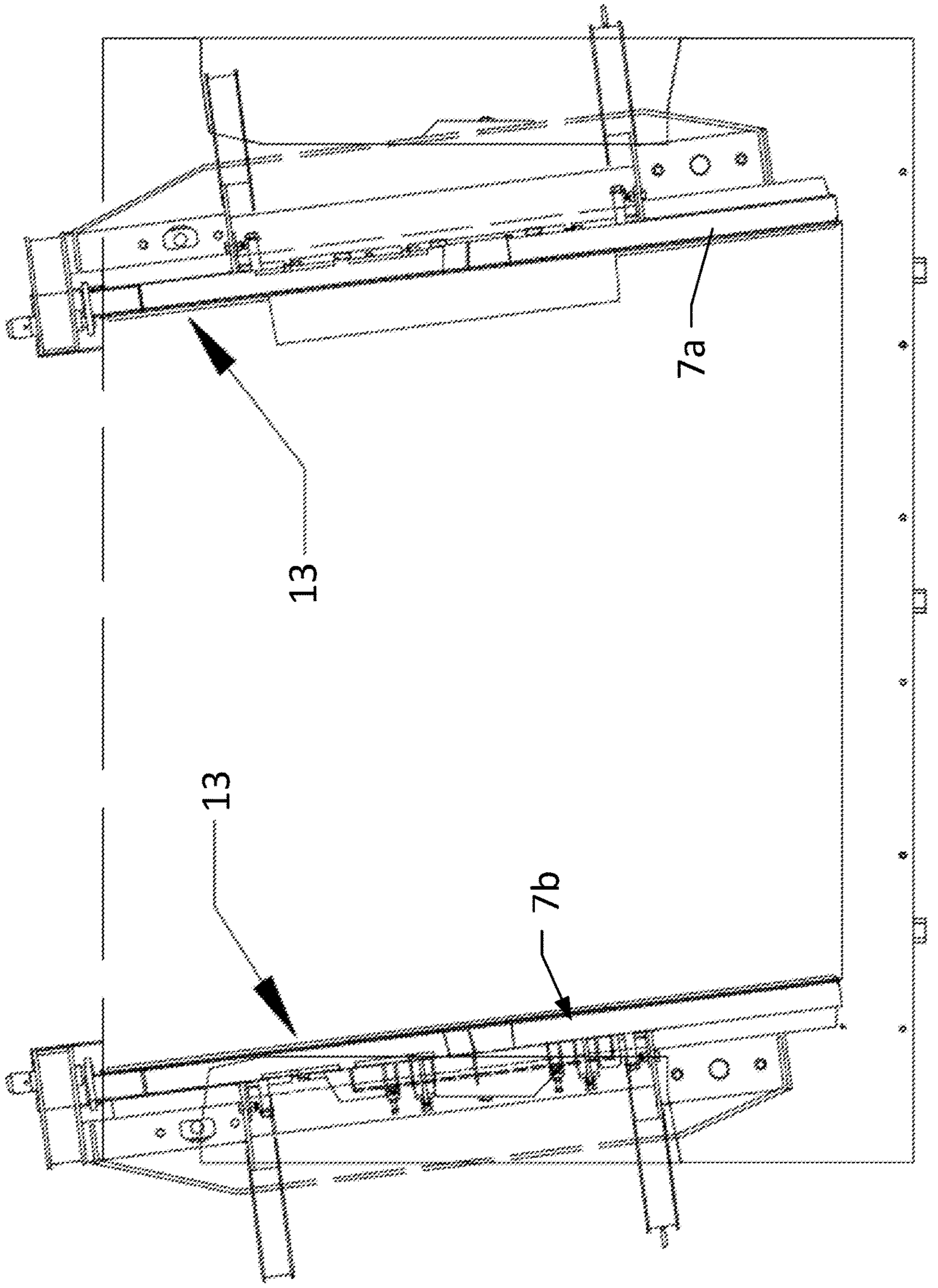
FIG. 10 is a front elevational view of the forming panels of FIG. 10, showing a front forming panel and the left and right side forming panels at opposing lateral ends.

Generally, the door 6 with changeable forming panels 7 along with the changeable floor forming panel 4 provide a custom precast traffic barrier panel 3 with various geometries 8 (FIG. 7), sizes 9 (FIG. 7), and attachment hardware 2 (FIGS. 2A-2C).

As shown in FIGS. 2A-2C, the attachment hardware 2 can be, for example, one or more threaded upstanding steel bolt studs, on and/or extending out from a top of the traffic barrier panels 3 for enabling installation of sound walls and/or light poles by the inclusion of a removeable floor forming panel on the floor of the adjustable mold 5, which is actually the top side of the traffic barrier panel 3, because the traffic barrier panel 3 is poured and cast upside down. The inclusion of the floor changeout allows the insertion of anchor bolts into the panels 3 so when the casting is removed, the thread stubs are left protruding out and ready to receive the light pole and/or sound wall base.

The operation of the adjustable mold 5 will now be generally described for the purpose of making a precast concrete traffic barrier panel 3.

First, an embodiment of an adjustable mold 5 as described previously and shown in FIGS. 4 and 5 is provided.

The door 6 is uninstalled, or opened, if not already uninstalled from the mold body 10.

The left side forming panel 7*a* and the right side forming panels are adjusted to reflect respectively a desired left side two-dimensional geometry and a desired right side two-dimensional geometry for respectively the left side and right side of the traffic barrier panel 3 to be made. This can be accomplished by adjusting or replacing the forming panels 7 on an existing door 6, replacing the door 6 with another interchangeable door 6 that has desired fixed configurations for the forming panels 7, or a combination of the foregoing.

The door 6 with desired configuration of the forming panels 7 is closed, or installed, on the mold body 10.

Next, liquified concrete is poured into the concrete inlet situated at the top of the mold body 10. In the preferred embodiment, the liquified concrete is poured into the triangular open cavity 14, which creates the rearwardly-extending, horizontal, triangular stem, or protrusion, associated with the preferred embodiment of the panel 3.

The concrete is then permitted to solidify in order to make the traffic barrier panel 3.

Finally, the door 6 is uninstalled, or opened, and the solidified traffic barrier panel 3 is removed from the mold body.

It should be emphasized that the above-described embodiments of the present invention, particularly, any "preferred" embodiments, are merely possible nonlimiting examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention.

As an example of a variation, the adjustable mold 5 of the present disclosure can be utilized to make a variety of different shapes and sizes of concrete panels and not limited to the panel configuration associated with the preferred embodiment that is shown in FIGS. 2A-2C. In other words, the surface geometry of the panel body at any of the front, back, top, bottom, left, and right sides can be different than that of the particular traffic barrier panel 3.

Furthermore, although not desirable in the preferred embodiment of the adjustable mold 5, a traffic barrier panel without the rearwardly extending horizontal triangular stem, or protrusion (that serves as a counterweight in the soil backfill) can be made with the adjustable mold 5 by eliminating the forming panels associated with this feature.

The invention claimed is:

1. An adjustable mold for making precast concrete traffic barrier panels with different geometries for creating a continuous traffic barrier by placing the traffic barrier panels in a contiguous side-by-side arrangement adjacent a roadway atop a modular earth retaining wall, each traffic barrier panel having a body with at least front, back, top, bottom, left, and right sides, the adjustable mold comprising:

a mold body having a plurality of walls that define an interior chamber, a door opening to the interior chamber, and a concrete inlet to the interior chamber;

a door, the door designed to be installed on and to be uninstalled from the mold body to respectively close and open the door opening, the door having adjustable forming panels that are designed to define a left side two-dimensional geometry and a right side two-dimensional geometry of the left and right sides respectively of a traffic barrier panel to be made, each of the two-dimensional geometries being changeable by adjusting the adjustable forming panels among a plurality of possible fixed settings, each setting defining a particular traffic barrier panel with a particular left side two-dimensional geometry and a particular right side two-dimensional geometry at the left and right sides, respectively, that are different than other settings; and wherein the interior chamber of the mold body in combination with an interior side of the door define an outer surface geometry of the front, back, top, bottom, left, and right sides of the traffic barrier panel to be made.

2. The mold of claim 1, wherein the left and right sides of the panel to be made are planar and wherein the two-dimensional geometry that is defined and that is changeable at each of the left and right sides includes a first angle of a planar side surface that extends between the bottom side and the top side of the panel to be made and a second angle of the planar side surface that extends between the front side and the back side of the panel to be made.

3. The mold of claim 1, wherein the left and right sides are planar;

wherein a left side two-dimensional geometry defined and changeable at the left side includes a first angle of a planar left side surface that extends between the bottom side and the top side of the panel to be made and a second angle of the planar left side surface that extends between the front side and the back side of the panel to be made;

wherein a right side two-dimensional geometry that is defined and changeable at the right side includes a third angle of a planar right side surface that extends between the bottom side and the top side of the panel to be made and a fourth angle of the planar right side surface that extends between the front side and the back side of the panel to be made; and wherein the forming panels comprise a left side forming panel and a right side forming panel, the left side and right side forming panels mounted to the door and designed to define respectively the left side surface and the right side surface.

4. The mold of claim 1, wherein the forming panels comprise a left side forming panel and a right side forming panel, the left side and right side forming panels mounted to the door and designed to define respectively the left side and right side two-dimensional geometries.

5. The mold of claim 1, further comprising a removable floor forming panel situated in the interior chamber, the floor forming panel designed to be installed on and to be uninstalled from the mold body, the floor forming panel designed to define a geometry of the top side of the panel to be made.

6. A method for making a precast concrete traffic barrier panel, comprising the steps of:

providing a mold as defined in claim 3;

uninstalling the door from the mold body;

changing the first forming panel and the second forming panel to reflect respectively a desired left side two-dimensional geometry and a desired right side two-dimensional geometry for respectively the left side and right side of the traffic barrier panel to be made;

installing the door on the mold body;

introducing liquified concrete into the concrete inlet of the mold body;

permitting the concrete to solidify in order to make the traffic barrier panel;

uninstalling the selected one of the interchangeable doors; and removing the solidified traffic barrier panel from the mold body.

* * * * *